UNITED STATES PATENT OFFICE.

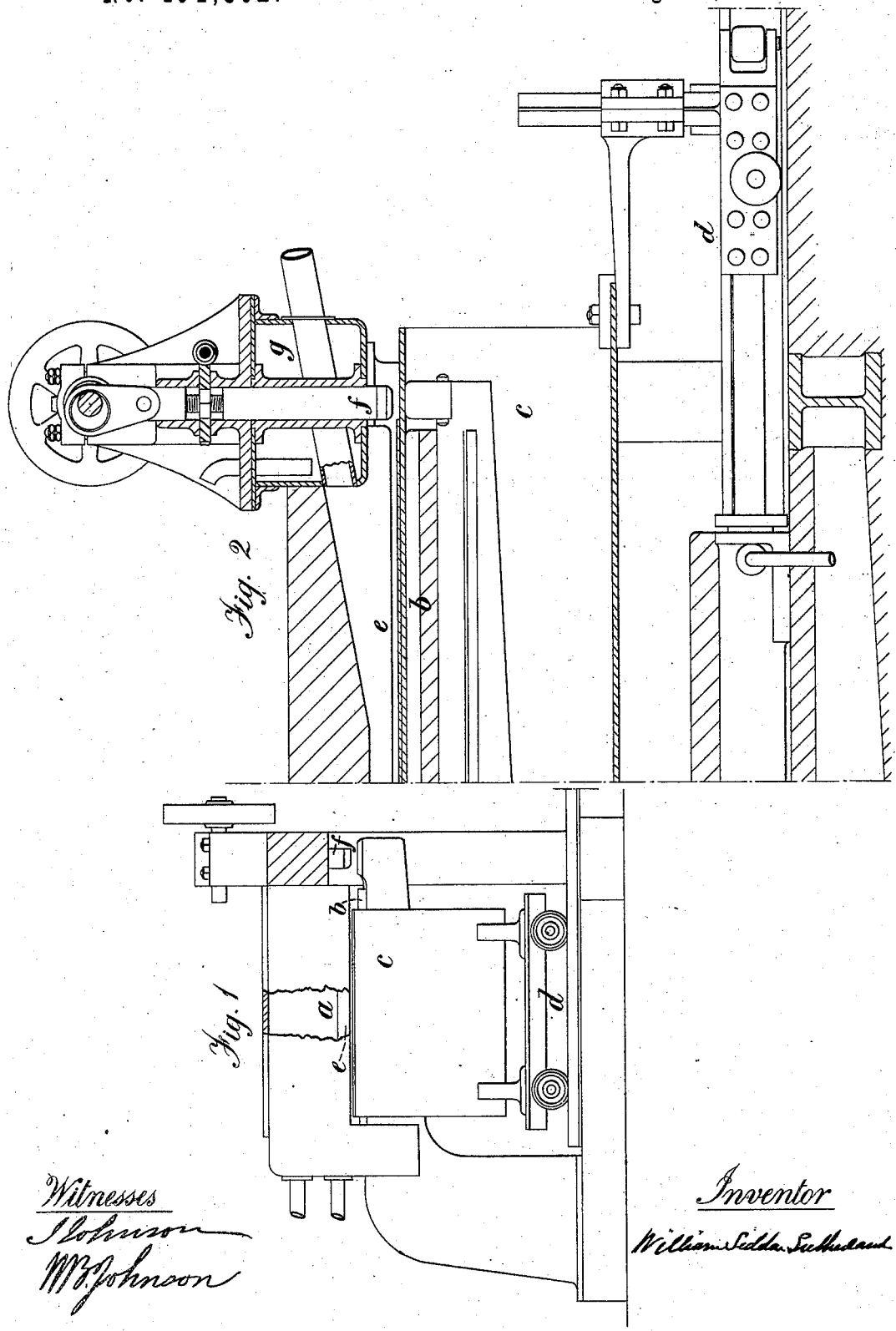

WILLIAM S. SUTHERLAND, OF COOMBS WOOD, HALESOWEN, ENGLAND.

IMPROVEMENT IN MACHINES FOR WELDING METAL TUBES.

Specification forming part of Letters Patent No. 194,502, dated August 21, 1877; application filed March 12, 1877; patented in England, July 14, 1874, for fourteen years.

*To all whom it may concern:*

Be it known that I, WILLIAM SEDDON SUTHERLAND, of Coombs Wood, Halesowen, in the county of Worcester, England, have invented a new and useful Improvement in Apparatus or Appliances to be used in Welding Metal, which improvement was patented in England, (No. 1,784, of 1874,) and is fully set forth in the following specification, reference being had to the accompanying drawings, in which—

Figure 1 is a side elevation, partly in section, of apparatus or appliances constructed in accordance with my invention, wherein gaseous fuel may be employed; and Fig. 2 is a sectional view, showing a water-chamber inclosing the hammer for keeping the same cool, and a modification of the carriage for supporting and conveying the tube.

Like letters refer to like parts wherever they occur.

This invention has for its object to provide apparatus or appliances to be used mainly in welding together the edges of tubes, and for like purposes; and consists, essentially, in employing in combination a furnace or firechamber so constructed as to heat the article to be welded along the whole or greater portion of the line of weld, and a hammer and beak for joining the edges to be welded.

I will now proceed to describe my invention with reference to the drawings, so that others skilled in the art to which it appertains may apply the same.

$a$ indicates the mixing and combustion chamber, to which the gaseous fuel (when such is employed) may be admitted by suitable pipes. Extending the length of the lower surface of the combustion-chamber $a$ is a slot, $e$, for the passage of the flame, and beneath chamber $a$ is an arm, $b$, which corresponds to a furnace-hearth, or acts to support the metal to be heated. The outer end of beak, arm, or hearth $b$ serves (or may be constructed to serve) as an anvil.

In advance of the combustion-chamber $a$, and preferably supported thereby, is a hammer, $f$, worked by an eccentric and pulley, or other well-known mechanism. In order to keep the hammer cool it may be surrounded by a suitable water-chamber, as shown in Fig. 2.

$c$ indicates the tube or similar article to be welded, which is supported upon and carried by a carriage, $d$, of any suitable construction, the carriage, preferably, moving on a track arranged beneath the beak or hearth $b$.

The operation of my devices is as follows: The tube-skelp or like article to be welded is placed upon carriage $d$ and pushed beneath the combustion-chamber $a$, and between it and beak or hearth $b$, the edges to be welded being so located as to be under the action of the flame escaping from combustion-chamber $a$ by slot $e$. As soon as a welding-heat is obtained the carriage $d$ is gradually withdrawn, bringing the edges to be welded continuously beneath hammer $f$, which operates to weld up the seam or lap.

In some cases solid or liquid fuel may be burned in combustion-chamber $a$, and the well-known blast employed to direct the flame downward upon the metal on beak or hearth $b$.

The advantage arising from the construction shown is that the metal is brought to a uniform heat along the entire line of weld, or for a sufficient distance along the line of weld to prevent buckling from unequal expansion, and to insure good results not heretofore obtained.

Having thus described my invention, what I claim, and desire to secure by Letters Patent, is—

1. In a metal-welding machine of the class specified, the combination of the slotted combustion-chamber and the beak arranged in relation thereto, substantially as and for the purpose specified.

2. The combination of the slotted or open combustion-chamber, the beak serving as an anvil, and the hammer, the whole substantially as and for the purpose specified.

WILLIAM SEDDON SUTHERLAND.

Witnesses:
    J. JOHNSON,
    W. B. JOHNSON.